UNITED STATES PATENT OFFICE 2,606,842

STABILIZED ROSIN SIZE

Charles C. Price, South Bend, Ind., assignor to Hercules Powder Company, Wilmington, Del., a corporation of Delaware No Drawing. Application October 25, 1947,
Serial No. 782,227

13 Claims. (Cl. 106—218)

This invention relates in general to a stabilized material and in particular to a natural resin stabilized with an aryl nitro compound.

Rosin and rosinlike materials are generally characterized by being relatively susceptible to oxidation under the normal conditions of storage and use. For example, a rosin-containing film, powder or emulsion is characterized by rapid deterioration upon exposure to the atmosphere and for this reason it is highly desirable to devise a method for inhibiting the oxidation of rosin materials.

Now in accordance with the present invention, a natural resin or a modified natural resin is stabilized against deterioration by the incorporation therein of an aryl nitro compound and optionally a paraffin oil. Thus, in the preparation of a resin composition, a material containing at least one nitro group on an aromatic nucleus is incorporated into the resin, whereby the deterioration by oxidation is substantially inhibited. The aryl nitro compound may conveniently be added to the resin at a stage in its preparation or compounding such as, for example, to the refined resin prior to its formation into a soap, emulsion or the like, or alternatively after the preparation of the resin-containing material.

The general nature of the invention having been described, the following examples are presented in illustration of specific methods for carrying out the invention.

EXAMPLE 1

One hundred parts of a partially decarboxylated gum rosin was heated to 90–100° C. and 0.5 part m-dinitrobenzene was added thereto. The rosin was then dispersed in water according to conventional techniques using about 5 parts of casein, about 7 parts of 28% ammonia and sufficient water to produce a 40% solids dispersion. The resulting material was a fine rosin dispersion stabilized against oxidation.

EXAMPLE 2

To 100 parts of a partially decarboxylated gum rosin heated to 90–100° C. there were added 0.5 part m-dinitrobenzene and 5 parts paraffin oil. A dispersion of this resin in water was prepared by the procedure of Example 1.

EXAMPLE 3

To 100 parts of a partially decarboxylated gum rosin heated to 90–100° C. there were added 0.5 part trinitrotoluene and 5 parts paraffin oil. A dispersion of this resin in water was prepared by the procedure of Example 1.

EXAMPLE 4

To 100 parts of a partially decarboxylated gum rosin heated to 90–100° C. there were added 0.5 part 1,3,5-trinitrobenzene and 5 parts paraffin oil. A dispersion of this resin in water was prepared by the procedure of Example 1.

EXAMPLE 5

To 100 parts of a partially decarboxylated gum rosin heated to 90–100° C. there were added 1.0 part m-dinitrobenzene and 5 parts paraffin oil. A dispersion of this resin in water was prepared by the procedure of Example 1.

EXAMPLE 6

To 100 parts of a partially decarboxylated gum rosin heated to 90–100° C. there was added 1.0 part m-dinitrobenzene. A dispersion of this resin in water was prepared by the procedure of Example 1.

EXAMPLE 7

To 100 parts of a partially decarboxylated gum rosin heated to 90–100° C. there were added 1 part m-dinitrobenzene and 2 parts paraffin oil. A dispersion of this rosin in water was prepared according to the procedure of Example 1.

EXAMPLE 8

To 100 parts of a partially decarboxylated gum rosin heated to 90–100° C. there was added 3 parts m-dinitrobenbene. A dispersion of this rosin in water was prepared according to the procedure of Example 1.

EXAMPLE 9

The procedure of the previous examples was repeated using as the added agent 1% nitrated phenyl-β-naphthylamine without paraffin oil.

EXAMPLE 10

The procedure of the preceding examples was repeated using 1% 2-nitro-1,4-diaminobenzene.

EXAMPLE 11

The procedure of the preceding examples was repeated using 1% 2,4-dinitrodiphenylamine.

EXAMPLE 12

One hundred parts of K gum rosin was heated to 100° C. and 0.5 part m-dinitrobenzene and 5 parts paraffin oil were added thereto. The rosin was dispersed in water according to the procedure of Example 1.

The effectiveness of the aryl nitro compounds used according to Examples 1–12 was determined by comparing the oxidation resistance of the product to a similar composition containing no added antioxidant. Four different methods were used to measure the beneficial effects of the antioxidant. According to the first method, a film of the resin material was cast on a glass plate and allowed to stand in air at room temperature for 3 weeks. The effectiveness of the oxidation inhibitor was measured by the length of time for which the film remained tacky and non-brittle. According to the second method of testing, paper cards were cemented together with the products of Examples 1–12 and with similar compositions containing no antioxidants and allowed to stand in air at room temperature. The effectiveness of the oxidation inhibitor was measured by the length of time for which satisfactory bonding was retained. According to the third method of testing, a two-gram sample of the dispersion to be tested was placed in a 50-ml. volumetric flask and covered with 15 grams of sand. The flask was evacuated at 70° C. to remove all the water and was then flooded with oxygen at atmospheric pressure and the system closed. The amount of oxidation was measured by the drop in pressure as determined by a mercury manometer. According to the fourth method of testing, a weighed sample of the water dispersion was spread over a large amount of sand, all the water removed under vacuum and the dried sample on the sand was stored under oxygen at 300 p. s. i. in an oxygen bomb at room temperature for 7 days. The sample was again dried under vacuum and weighed.

The test data for Examples 1–12 according to the methods of testing are presented in Table 1. In each case, the resin composition containing the aryl nitro compound showed increased oxidation resistance according to each of the tests applied, the oxidation resistance generally being measurably increased by the copresence of paraffin oil.

the sample maintained at 70° C. for 4 hours. The sample had absorbed oxygen corresponding to a pressure differential of only 2 mm. of mercury, while the sample under identical conditions containing no oxidation inhibitor absorbed oxygen corresponding to a pressure differential of 35 mm.

EXAMPLE 14

A 40% alcohol solution of a rosin methyl ester containing 0.5% m-dinitrobenzene as a stabilizer was tested as in Example 13. The rosin methyl ester containing m-dinitrobenzene absorbed oxygen corresponding to a pressure differential of 11 mm. of mercury, while a similar sample containing no inhibitor absorbed oxygen corresponding to a pressure differential of 38 mm. of mercury.

EXAMPLE 15

A 40% alcohol solution of partially decarboxylated gum rosin containing 0.5% m-dinitrobenzene was tested according to the procedure of Examples 13 and 14. The rosin containing m-dinitrobenzene absorbed oxygen corresponding to a pressure differential of 9 mm. of mercury while this rosin with no inhibitor absorbed oxygen corresponding to a pressure differential of 297 mm.

EXAMPLE 16

A dry size was prepared from centrifuged K gum rosin by saponification under heat and pressure and spray drying according to conventional procedures. To a portion of the thus prepared dry size, there was added 0.5% m-dinitrobenzene while both the dry size and m-dinitrobenzene were dissolved in acetone. The solvent was removed leaving a stabilized dry size.

EXAMPLE 17

The above procedure was repeated using 1% m-dinitrobenzene as the stabilizer.

EXAMPLE 18

To 100 parts of centrifuged K gum rosin were added 0.5 part m-dinitrobenzene and 6 parts

*Table 1*

| | Type of Resin | Percent Aryl Nitro Compound | Percent Paraffin Oil | Tackiness of Film on Glass Plate | Bonding Durability | Manometric Oxidation (pressure difference mm. Hg) | Oxygen Bomb Percent Gain in Weight |
|---|---|---|---|---|---|---|---|
| Example 1 | Partially decarboxylated gum rosin. | 0.5% m-dinitrobenzene | None | About 3 wks | About 6–8 wks | 89 | |
| Example 2 | ...do... | ...do... | 5% | ...do... | ...do... | 44 | |
| Example 3 | ...do... | 0.5% trinitrotoluene | 5% | ...do... | ...do... | 42 | |
| Example 4 | ...do... | 0.5% 1,3,5-trinitrobenzene | 5% | ...do... | ...do... | 29 | 3.3 |
| Example 5 | ...do... | 1.0% m-dinitrobenzene | 5% | ...do... | ...do... | 27 | |
| Example 6 | ...do... | ...do... | None | ...do... | ...do... | 24 | |
| Example 7 | ...do... | ...do... | 2% | ...do... | ...do... | 21 | |
| Example 8 | ...do... | 3% m-dinitrobenzene | None | ...do... | Over 14 wks | 17 | |
| Example 9 | ...do... | 1% nitrated phenyl-β-naphthylamine. | None | ...do... | | 40 | |
| Example 10 | ...do... | 1% 2-nitro-1,4-diaminobenzene. | None | ...do... | | 27 | |
| Example 11 | ...do... | 1% 2,4-dinitrodiphenylamine | None | ...do... | | 251 | |
| Control for Examples 1–11. | ...do... | None | None | Less than 1 day | Less than 3 days | 499 | 9.5 |
| Example 12 | K gum rosin | 0.5% m-dinitrobenzene | 5% | | | 49 | |
| Control for Example 12. | ...do... | None | None | | | 330 | |

EXAMPLE 13

There was prepared a 40% alcohol solution of FF wood rosin containing 0.5% m-dinitrobenzene. A sample of this containing 2 grams of rosin was placed on 30 grams of sand according to the manometric oxidation procedure described for the previous examples. The alcohol was removed by evaporation under reduced pressure and paraffin oil. A dry size was prepared from the thus treated rosin by saponification and spray drying by the procedure of Example 16.

EXAMPLE 19

Two-gram samples of each of the dry sizes in Examples 16–18 were placed in oxidation flasks and these samples were subjected to oxidation at 120° C. for 170 minutes according to the manometric oxidation technique described for Examples 1–11. Significant oxidation resistance was noted as indicated by the data in Table 2 wherein there was a measurable decrease in oxygen absorption in the treated dry sizes as compared with a dry size containing no oxidation inhibitor. The test data from Examples 13–15 are included in Table 2 for comparison.

*Table 2*

|  | Rosin Composition | Inhibitor (Aryl Nitro) | Paraffin Oil | Manometric Oxidation (pressure difference mm. Hg) |
|---|---|---|---|---|
| Example 13 | FF wood rosin | 0.5% m-dinitrobenzene | None | 2 |
| Control for Example 13 | do | None | None | 35 |
| Example 14 | Rosin methyl ester | 0.5% m-dinitrobenzene | None | 11 |
| Control for Example 14 | do | None | None | 38 |
| Example 15 | Partially decarboxylated gum rosin | 0.5% m-dinitrobenzene | None | 9 |
| Control for Example 15 | do | None | None | 297 |
| Example 16 | K gum rosin dry size | 0.5% m-dinitrobenzene | None | 170 |
| Example 17 | do | 1.0% m-dinitrobenzene | None | 118 |
| Example 18 | do | 0.5% m-dinitrobenzene | 6% | 215 |
| Control for Ex. 16–18 | do | None | None | 430 |

In selecting the resin for the composition according to this invention, there may be used the various grades of wood or gum rosin as desired such as, for example, an FF wood rosin or one of the paler or darker grades of rosin and natural resins. Thus, there may be used rosin itself, hydrogenated rosin, polymerized rosin, partially decarboxylated rosin, heat-treated rosin, or the like, as well as rosin esters, rosin amine, and other resin acid derivatives, either alone or two or more of these materials in combination. Likewise, there may be used various darker grades of rosin and natural resins such as, for example, a dark-colored resin separated as a by-product during the refining of a wood or gum rosin and characterized by being partially gasoline-insoluble or a dark-colored pine resin separated from crude wood rosin during its refining to FF wood rosin. Highly satisfactory results have been obtained by using as the rosin a mixture of two or more rosins and other natural resins such as, for example, a mixture of an ordinary wood or gum rosin together with a partially or substantially gasoline-insoluble dark-colored rosin by-product material.

Thus, the term "natural resin" as used in the specification and claims will be understood to include materials such as wood or gum rosin and also rosinlike materials and modified rosins and resins which are similar in properties to rosin and are characterized by being saponifiable to form materials substantially like rosinates; and the term "resinate," therefore, includes the substantially neutral, saponified material obtained therefrom.

Various rosin modifiers such as plasticizers and other rosin compatible nonrosin materials and compositions may be added to the composition itself or to the resin prior to its compounding to an extent conforming with its compatibility with the resin, in order to improve or modify the physical or chemical properties of the resin component or the dry resinate composition. For example, small amounts of plasticizers and rosin extenders may be included in the composition to improve the properties thereof or to reduce the cost of the composition.

The aryl nitro compound used as the stabilizing agent according to this invention is characterized by having at least one nitro group directly on an aromatic nucleus in an aromatic organic compound. In the specific examples, there are shown various aromatic nitro compounds containing one or more nitro groups on relatively simple aromatic nuclei. It will be understood, however, that other and more complicated aromatic radicals may be used such as, for example, various mono-, di- and polycyclic aromatic compounds as well as heterocyclic aromatic compounds and the like. Likewise, it will be understood that the aromatic nucleus may have other groups substituted thereon such as, for example, alkyl, aryl, halogen, amino, and the like, as well as oxygen-containing groups such as, for example, alkoxy, carboxyl, and the like. Thus, for example, there may be used the various mono-, di- and the polynitro-substituted aromatic compounds as will be readily apparent to those skilled in the art.

Typical nitro-containing compounds which have been found satisfactory are m-dinitrobenzene, 1,3,5-trinitrobenzene, 2,4,6-trinitrotoluene, 2,4-dinitrotoluene, nitrobenzene, nitrated phenyl - β - naphthylamine, 2 - nitro - 1,4 - diaminobenzene, 2,4-dinitrodiphenylamine, and the like. In addition to these specifically named nitro compounds, it will be understood, of course, that there may be used other aromatic compounds characterized by having at least one nitro group substituted on an aromatic nucleus.

Instead of the paraffin oil specifically disclosed in the examples, there may be used as the co-acting stabilizing agent other oils, waxes and waxlike materials such as vegetable or mineral oils and waxes including, in addition to paraffin oil, paraffin wax, petrolatum, crude scale wax, certain napthenic-base petroleum oils, various waxes, and the like.

The stabilizing agents may be incorporated into the resin at any desired or convenient stage in the preparation of the refined resin material of the resin-containing composition. For example, when it is desired to prepare a stabilized resin per se, it will be convenient to add the stabilizing agents to the resin during the refining and purification thereof or alternatively to treat the resin with a solution containing the stabilizing agents or to add the stabilizing agents to the molten resin or to a solution or dispersion of resin. Similarly, where it is desired to prepare a resin emulsion, it will be convenient to add the stabilizing agents as above or, preferably, to add the stabilizing agents during the preparation of the emulsion. Likewise, in the preparation of a dry resin composition such as, for example, a dry, saponified resin, the stabilizing agents may be added prior to, during, or after the saponification or drying of the composition. For example, the stabilizing agents may be added during the saponification of the resin prior to the drying step in which case it has generally been found advisable to avoid excessive or drastic conditions during the subsequent operations in order to prevent loss of the stabilizing agents through chemical action or volatilization. Alternatively, the agents may be added to the dried composition, and in the case of a dry, saponified rosin material it has generally been found quite satisfactory to treat the dry material with a solution of the stabilizing agents preferably in a solvent which is a non-solvent for the saponified rosin.

The proportions of the stabilizing agents may be varied within relatively wide limits. For example, an amount of the aryl nitro compound as low as about 0.1% adds a substantial degree of stability to the resin composition. This stabilizing agent may be used in amounts up to as high as 5% based on the amount of rosin above which amount the stability is increased only to a minor extent. The preferred range of proportion is about ½ to about 3% of the nitro compound. Similarly, the amount of the paraffin oil may be varied from about 1 to about 10% and preferably in the neighborhood of about 5%, although substantial stability is imparted by the nitro compound in the absence of the paraffin oil.

The stabilized rosin and rosin composition prepared according to this invention may be used in the various places and for the various uses where the unstabilized counterpart has been used or has been found relatively less useful because of its instability, and it possesses the same advantageous characteristics with the addition that it retains its characteristics for longer periods of time under less favorable conditions.

What I claim and desire to protect by Letters Patent is:

1. A stabilized rosin size resistant to oxidation comprising, in particulate form, a member selected from the group consisting of rosin, saponified rosin, and mixtures thereof and containing a stabilizing amount of an aryl nitro compound said aryl nitro compound having from 1 to 3 nitro groups attached to the aryl nucleus and which may contain as additional substituents only members selected from the group consisting of amino, phenyl and methyl, the nucleus of said aryl compound being derived from the group consisting of benzene and naphthalene.

2. A stabilized paste rosin size, resistant to oxidation, comprising an aqueous emulsion of rosin and a stabilizing amount of an aryl nitro compound said aryl nitro compound having from 1 to 3 nitro groups attached to the aryl nucleus and which may contain as additional substituents only members selected from the group consisting of amino, phenyl, and methyl, the nucleus of said aryl compound being derived from the group consisting of benzene and naphthalene.

3. A stabilized paste rosin size, resistant to oxidation, comprising an aqueous emulsion of rosin and a stabilizing amount of paraffin wax an aryl nitro compound said aryl nitro compound having from 1 to 3 nitro groups attached to the aryl nucleus and which may contain as additional substituents only members selected from the group consisting of amino, phenyl and methyl, the nucleus of said aryl compound being derived from the group consisting of benzene and naphthalene.

4. A stabilized paste rosin size, resistant to oxidation, comprising an aqueous emulsion of rosin and a stabilizing amount of an aryl nitro compound, said aryl nitro compound having from 1 to 3 nitro groups attached to the aryl nucleus and which may contain as additional substituents only members selected from the group consisting of amino, phenyl, and methyl, the nucleus of said compound being derived from benzene.

5. A stabilized paste rosin size, resistant to oxidation, comprising an aqueous emulsion of rosin and a stabilizing amount of paraffin oil and an aryl nitro compound, said aryl nitro compound having from 1 to 3 nitro groups attached to the aryl nucleus and which may contain as additional substituents only members selected from the group consisting of amino, phenyl, and methyl, the nucleus of said compound being derived from benzene.

6. A stable paste rosin size, resistant to oxidation, comprising a high free rosin aqueous emulsion of rosin and saponified rosin together with between about 1 and about 10% of a paraffin oil and between about 0.1 and about 5% of an aryl nitro compound, said aryl nitro compound having from 1 to 3 nitro groups attached to the aryl nucleus and which may contain as additional substituents only members selected from the group consisting of amino, phenyl, and methyl, the nucleus of said compound being derived from benzene.

7. A stable paste rosin size, resistant to oxidation, comprising a high free rosin aqueous emulsion of rosin and saponified rosin together with about 5% paraffin oil and between about 0.5 and about 3% of m-dinitrobenzene.

8. A stable paste rosin size, resistant to oxidation, comprising a high free rosin aqueous emulsion of rosin and saponified rosin together with about 5% paraffin oil and between about 0.5 and about 3% of 1,3,5-trinitrobenzene.

9. A stable paste rosin size, resistant to oxidation, comprising a high free rosin aqueous emulsion of rosin and saponified rosin together with about 5% paraffin oil and between about 0.5 and about 3% of 2,4,6-trinitrotoluene.

10. A stable dry rosin size resistant to oxidation comprising in particulate form saponified rosin and a stabilizing amount of an aryl nitro compound said aryl nitro compound having from 1 to 3 nitro groups attached to the aryl nucleus and which may contain as additional substituents only members selected from the group consisting of amino, phenyl and methyl, the nucleus of said aryl compound being derived from the group consisting of benzene and naphthalene.

11. A stable dry rosin size resistant to oxidation comprising in particulate form saponified rosin and a stabilizing amount of a paraffin oil and an aryl nitro compound said aryl nitro compound having from 1 to 3 nitro groups attached to the aryl nucleus and which may contain as additional substituents only members selected from the group consisting of amino, phenyl and methyl, the nucleus of said aryl compound being derived from the group consisting of benzene and naphthalene.

12. A stable dry rosin size resistant to oxidation comprising in particulate form saponified rosin and about 5% paraffin oil and between about 0.5 and about 3% of an aryl nitro compound, said aryl nitro compound having from 1 to 3 nitro groups attached to the aryl nucleus and which may contain as additional substituents only members selected from the group consisting of amino, phenyl, and methyl, the nucleus of said compound being derived from benzene.

13. A stable dry rosin size resistant to oxidation comprising in particulate form saponified rosin and about 5% paraffin oil and between about 0.5% and about 3% of dinitrobenzene.

CHARLES C. PRICE.

REFERENCES CITED

The following references are of record in the file of this patent:

UNITED STATES PATENTS

| Number | Name | Date |
|---|---|---|
| 1,379,235 | Witty | May 24, 1921 |
| 1,946,322 | Kennedy | Feb. 6, 1934 |
| 1,988,300 | Clark | Jan. 15, 1935 |
| 2,244,075 | Mikeska | June 3, 1941 |
| 2,294,724 | Dreshfield | Sept. 1, 1942 |
| 2,384,061 | Auer | Sept. 4, 1945 |